UNITED STATES PATENT OFFICE 2,635,121

DEHALOGENATION OF FLUORINE COMPOUNDS

Lee B. Smith, Woodbridge, N. J., and Charles B. Miller, Lynbrook, N. Y., assignors to Allied Chemical & Dye Corporation, New York, N. Y., a corporation of New York No Drawing. Application October 17, 1951, Serial No. 251,808

8 Claims. (Cl. 260—653)

This invention relates to the dehalogenation of compounds containing at least two adjacent carbon atoms each having attached thereto at least one halogen atom.

It has been proposed to subject a starting material such as 1-bromo-2,2-dichloro-2-fluoroethane (CCl$_2$FCBrH$_2$) to the action of zinc in the presence of anhydrous ethanol. In the resulting reaction, one bromine atom and one chlorine atom are removed from adjacent carbon atoms, and the product 1-chloro-1-fluoroethylene (CH$_2$=CClF) is obtained. As practiced in accordance with prior knowledge, reactions of this nature are characterized by the existence of a substantial time-lapse prior to the beginning or induction of reaction between the starting material and the zinc, use of a large excess of zinc over that theoretically required to effect halogen removal from the starting material, use of ethanol as the reaction medium, and maintenance of relatively rigorous anhydrous conditions in the reaction, i. e., by use of absolute ethanol.

This invention is directed to improvements in carrying out dehalogenating reactions of the type indicated, especially reactions involving use of starting materials containing fluorine. Such improvements provide for substantial shortening or practical elimination of reaction induction time, substantial decrease of the excess amount of zinc required, and the permissible and preferred use of appreciably hydrous conditions in the reaction.

The invention comprehends the use as starting materials, to be dehalogenated by the action of zinc, of fluorine compounds containing at least two adjacent acyclic saturated carbon atoms associated as in the formula—

CXYY$^1$CX$^1$Y$^2$F where each of X and X$^1$ is a halogen other than fluorine, and where each of Y and Y$^1$ and Y$^2$ is a member of the group consisting of hydrogen, a halogen, an aliphatic radical and an aromatic radical. X and X$^1$ may be the same or different halogens, but in any case are halogens other than fluorine. Desirably, the starting material may be a halogenated ethane containing at least one fluorine atom and having at least one halogen atom other than fluorine attached to each of the carbon atoms. In the more particular aspects of the invention, the starting material may be a completely chlorofluoro substituted ethane having at least one chlorine atom attached to each of the carbon atoms. Typical starting materials which may be used to exemplify practice of the invention are: 1,2,2-trichloro-1,1,2-trifluoroethane, CCl$_2$FCClF$_2$ (B. P. 47.6° C.), which results in the production of perfluorovinyl chloride, CClF=CF$_2$ (B. P. minus 28° C.); and 1,1,1,2-tetrachloro-2,2-difluoroethanes, CCl$_3$CClF$_2$ (B. P. 91° C.) which results in the production of 1,1-dichloro-2,2-difluoroethane.

In the general procedure involved in practice of the invention as applied to use e. g. of CCl$_2$FCClF$_2$ as the starting material, zinc dust is suspended by agitation in a reactor in an amount of the alcoholic reaction medium which usually about equals the volume of the starting material to be used. The alcoholic medium may be ethanol or methanol, either absolute or non-anhydrous. The trichlorotrifluoroethane is fed into the zinc suspension, and the CClF=CF$_2$ reaction product is taken off from the top of a fractionating column connected to the reactor and having a cold reflux head at the top. Material feed and heat are applied to the reactor and are controlled to permit as rapid a feed as possible without flooding the column. The reaction may be represented by the equation:

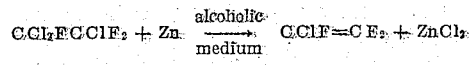

The several herein described control features of the invention contribute to effect a process which can be carried out at atmospheric pressures, elevated pressures being needed only in instances where some pressure may be needed to keep a particular starting material in the liquid phase during reaction. In this specification, "absolute" ethanol or methanol is used to indicate 99.5% or more of EtOH or MeOH.

During the development work which eventuated in the present improvements, it was found, when proceeding in accordance with known art, that there is a relatively long time-lapse between the beginning of feed of material to be dehalogenated into the zinc-alcoholic reaction medium slurry and the time of initiation of reaction, such induction period varying from, say 30 minutes to 3 hours depending upon the size of the particular operation involved.

In accordance with one phase of the invention, it has been found that the induction period can be greatly reduced, e. g. to substantial elimination, by carrying out the starting material-zinc reaction in the alcoholic reaction medium while in the presence of a small amount of HCl. The quantity of HCl employed may be any small amount sufficient under the conditions at hand to appreciably reduce time of induction of reaction. Commercially notable reduction of induction period may be had where the reaction is carried out in the presence of as little as 0.1% of 100% HCl based on the weight of the total starting material to be dehalogenated. The amount of HCl may be as much as 2% by weight, but greater quantities of HCl appear to afford no marked advantage. The HCl may be supplied to the reaction by addition to the zinc-alcohol slurry in any suitable way, for example, as say 35% hydrochloric acid. In one series of runs in which $CCl_2FCClF_2$ was reacted, in an approximately equal volume of 96.5% methanol, with about a 20% excess of zinc and in the presence of about 0.5% of HCl based on the weight of the total $CCl_2FCClF_2$, conversions of $CCl_2FCClF_2$ to $CClF=CF_2$ of 87–89% were obtained, the induction period was substantially eliminated, and the overall reaction time reduced from about 3 hours (reaction time in the absence of HCl) to about 1.5 hours. In similar runs, differing only in that the zinc excess was reduced to 10%, conversions of 80–85% were obtained, with the same results with respect to elimination of induction period. In this specification, "conversion" indicates amount of sought-for product actually recovered on the basis of the amount theoretically obtainable.

In the prior art, the use of absolute ethanol as the alcoholic reaction medium has been strongly emphasized. In accordance with another aspect of the invention, it has been found that it is not necessary to employ ethanol, nor is it necessary to maintain the anhydrous reaction conditions which are indicated by the prior art to be of first importance. To the contrary, we find that methanol, whether absolute or non-anhydrous, affords outstanding operating advantages with respect to decreasing the amount of excess zinc needed, and furthermore we have observed that moderately hydrous conditions are not only unobjectionable with regard to conversions but actually promote appreciable decrease of induction time. Hence, while absolute ethanol may be employed in the practice of some phases of the invention, e. g. minimizing the reaction induction period by use of HCl, on the other hand if ethanol is utilized it is preferred that this material be in the hydrous condition. However, the more desirable alcoholic reaction medium of the invention contemplated is methanol which may be absolute but is preferably hydrous. Moreover, the alcoholic medium utilized in practice of the better embodiments of the invention contains some water, but preferably not more than 6% by weight of the total liquid reaction medium.

With regard to use of hydrous alcoholic reaction medium, in one run, 94 parts of $CCl_2FCClF_2$ were reacted with a 20% excess of zinc suspended in absolute methanol, and a conversion to $CClF=CF_2$ of 86% was obtained. In two other runs, which were otherwise the same except that 98% and 95% methanol were employed as reaction medium, conversions to $CClF=CF_2$ were better than 87%. In two other comparable runs, otherwise the same except that absolute ethanol and 95% ethanol were used as the reaction mediums, conversions of about 78% and 79% respectively were obtained. These operations show that the presence of water not only does not adversely affect conversions, but gives notably better results regarding conversions. Further, best conversions were obtained with the hydrous methanol. Additionally, in another run, otherwise the same except that 95% methanol was used and the zinc excess was cut to the extremely low value of 10%, 85% conversion was obtained. During this group of runs, it was observed that the presence of water appreciably shortened the induction period and effected more smoothly proceeding reactions.

In accordance with a further phase of the invention, it has been found that by using methanol absolute or hydrous as the reaction medium, the excess of zinc over theoretical requirements may be substantially reduced. In one group of runs in which absolute ethanol was employed as a reaction medium, 94 parts of $CCl_2FCClF_2$ were reacted with zinc in amount of about 80% excess of theoretical requirements, and conversions to $CClF=CF_2$ ranged from about 75 to about 91%. In a run otherwise the same except that the zinc excess was 50% above theoretical requirements, conversion of about 76% was obtained, and in another similar run in which 100% zinc excess was employed, conversion to $CClF=CF_2$ was about 86%. Thus, with absolute ethanol and zinc excesses ranging from 50% to 100%, conversions vary between 75% and 91%. In a comparable series of five runs in each of which 94 parts of $CCl_2FCClF_2$ were reacted with a 20% excess of zinc in an absolute methanol medium, conversion to $CClF=CF_2$ was consistently in the range of 86–88%. A similar series of runs using absolute methanol and only a 10% zinc excess, showed average conversion of 82.5%. Accordingly, using absolute methanol and not more than 20% zinc excess, high conversions are obtained. Comparative runs in which 94 parts of $CCl_2FCClF_2$ were reacted with a 20% zinc excess, using 95% methanol and 95% ethanol, showed conversions to $CClF=CF_2$ of 87% and 79% respectively, and even when the zinc excess was cut to 10%, the 95% methanol resulted in an 85% conversion. Hence, the advantages afforded by the methanol are again outstanding. In the practice of this phase of the invention, it is preferred to use a zinc excess which at the outset of reaction is not substantially greater than 20% of the quantity stoichiometrically required to form the zinc salt of halogen removed from the particular starting material treated.

A series of runs, results of which are summarized below, exemplifies practice of preferred embodiment of the invention. In these runs, the starting material was $CCl_2FCClF_2$ and the product was $CClF=CF_2$. The reaction medium used was about 98.5% methanol in an amount in each run about equal to the incoming $CCl_2FCClF_2$. The quantity of zinc used was about 20% in excess of theoretical requirements. The amount of 100% HCl present in each batch in the reactor was about 0.5% based on the weight of the $CCl_2FCClF_2$ charged for each run. The reactor was operated at 58° C. and reflux continued for one hour after final addition of $CCl_2FCClF_2$. Product and excess methanol were distilled away from the $ZnCl_2$ and excess zinc until reactor temperature reached 210° C. Product was then distilled away from the methanol and the methanol returned to the next cycle without removal of low-boiling side products. Parts indicated are by weight.

| Used | | | | Total Take-off Reactor at 210° | CClF=CF$_2$ | Recovered MeOH | Percent Conversion |
| Zn | Make-up MeOH | Recycle MeOH | CCl$_2$FCClF$_2$ | | | | |
|---|---|---|---|---|---|---|---|
| 41 | 94 | ------ | 94 | 137 | 51.5 | 86 | 88.4 |
| 41 | 8 | 86 | 94 | 140 | 52.5 | 87 | 90.0 |
| 41 | 7 | 87 | 94 | 138 | 53.0 | 85 | 91.0 |
| 41 | 9 | 85 | 94 | 138 | 53.5 | 84 | 92.0 |
| 41 | 10 | 84 | 94 | 137 | 54.0 | 84 | 92.8 |
| 41 | 10 | 84 | 94 | 140 | 53.5 | 86 | 92.0 |
| 41 | 8 | 86 | 94 | 138 | 51.0 | -------- | 87.5 |
| 287 | 146 | | 658 | | 369 | | 90.5 Average |

We claim:

1. In the process for dehalogenating a compound containing at least two adjacent acyclic saturated carbon atoms associated as in the formula

CXYY$^1$CX$^1$Y$^2$F where each of X and X$^1$ is a halogen other than fluorine, and where each of Y and Y$^1$ and Y$^2$ is a member of the group consisting of hydrogen, a halogen, an aliphatic radical and an aromatic radical, which process comprises subjecting said compound to the action of zinc in the presence of an alcoholic reaction medium of the group consisting of methanol and ethanol and containing not more than 6% by weight of water, and while in the presence of HCl in small amount not more than 2% by weight based on the weight of said compound but sufficient to appreciably reduce time of induction of reaction.

2. The process for dehalogenating a halogenated ethane containing at least one fluorine atom and having at least one halogen atom other than fluorine attached to each of the carbon atoms, which process comprises subjecting said ethane to the action of an excess of zinc in the presence of an alcoholic reaction medium of the group consisting of methanol and ethanol and containing not more than 6% by weight of water, and while in the presence of HCl in amount substantially in the range of 0.1–2.0% by weight based on the weight of said ethane, said zinc excess initially being not substantially greater than 20% of the quantity required to form the zinc salt of halogen removed from said ethane.

3. The process for dehalogenating a halogenated ethane containing at least one fluorine atom and having at least one halogen atom other than fluorine attached to each of the carbon atoms, which process comprises subjecting said ethane to the action of zinc in the presence of an alcoholic reaction medium of the group consisting of methanol and ethanol and containing not more than 6% by weight of water, and while in the presence of HCl in amount substantially in the range of 0.1–2.0% by weight based on the weight of said ethane, whereby time of induction of reaction is reduced.

4. The process for dehalogenating a halogenated ethane containing at least one fluorine atom and having at least one halogen atom other than fluorine attached to each of the carbon atoms, which process comprises subjecting said ethane to the action of zinc in the presence of an aqueous alcoholic reaction medium of the group consisting of methanol and ethanol and containing not more than 6% by weight of water, and while in the presence of HCl in small amount, not more than 2% by weight based on the weight of said ethane, but sufficient to appreciably reduce time of induction of reaction.

5. The process for dehalogenating a halogenated ethane containing at least one fluorine atom and having at least one halogen atom other than fluorine attached to each of the carbon atoms, which process comprises subjecting said ethane to the action of an excess of zinc in the presence of an aqueous methanol reaction medium containing not more than 6% by weight of water while in the presence of HCl in small amount not more than 2% by weight based on the weight of said ethane but sufficient to appreciably reduce time of induction of reaction, said zinc excess initially being not substantially greater than 20% of the quantity required to form the zinc salt of halogen removed from said ethane.

6. The process for dehalogenating a completely chlorofluoro substituted ethane having at least one chlorine atom attached to each of the carbon atoms, which process comprises subjecting said ethane to the action of an excess of zinc in the presence of an aqueous methanol reaction containing not more than 6% by weight of water, and while in the presence of HCl in small amount, not more than 2% by weight based on the weight of said ethane, but sufficient to appreciably reduce time of induction of reaction, said zinc excess initially being not substantially greater than 20% of the quantity stoichiometrically required to form ZnCl$_2$ from a chlorine removed from each carbon atom.

7. The process for dehalogenating CCl$_2$FCClF$_2$ which comprises subjecting said CCl$_2$FCClF$_2$ to the action of zinc in the presence of an aqueous methanol reaction medium containing not more than 6% by weight of water, and while in the presence of HCl in small amount, not more than 2% by weight based on the weight of said CCl$_2$FCClF$_2$, but sufficient to appreciably reduce time of induction of reaction.

8. The process for dehalogenating CCl$_2$FCClF$_2$ which comprises subjecting said CCl$_2$FCClF$_2$ to the action of an excess of zinc in the presence of an aqueous methanol reaction medium containing not more than 6% by weight of water, and while in the presence of HCl in amount substantially in the range of 0.1–2.0% by weight based on the weight of said CCl$_2$FCClF$_2$, said zinc excess initially being not substantially greater than 20% of the quantity required to form ZnCl$_2$ from a chlorine removed from each carbon atom.

LEE B. SMITH.
CHARLES B. MILLER.

References Cited in the file of this patent

UNITED STATES PATENTS

| Number | Name | Date |
|---|---|---|
| 2,344,061 | Renoll | Mar. 14, 1944 |
| 2,399,024 | Harmon | Apr. 23, 1946 |
| 2,401,897 | Benning et al. | June 11, 1946 |
| 2,566,807 | Padbury et al. | Sept. 4, 1951 |
| 2,579,437 | Miller | Dec. 18, 1951 |